United States Patent
Sorensen (10) Patent No.: US 7,689,522 B2
(45) Date of Patent: Mar. 30, 2010

(54) METHOD AND SYSTEM OF ORGANIZING INFORMATION BASED ON HUMAN THOUGHT PROCESSES

(76) Inventor: Ronan Sorensen, 6325 Windermere Cir., North Bethesda, MD (US) 20852

( * ) Notice: Subject to any disclaimer, the term of this patent is extended or adjusted under 35 U.S.C. 154(b) by 1067 days.

(21) Appl. No.: 11/330,851

(22) Filed: Jan. 12, 2006

(65) Prior Publication Data
US 2007/0162225 A1    Jul. 12, 2007

(51) Int. Cl.
*G06F 17/00* (2006.01)
*G06N 5/00* (2006.01)

(52) U.S. Cl. ........................................... 706/45
(58) Field of Classification Search .................. 706/45
See application file for complete search history.

(56) References Cited

U.S. PATENT DOCUMENTS

| | | | | |
|---|---|---|---|---|
| 5,471,560 A | * | 11/1995 | Allard et al. ................. | 706/59 |
| 5,813,863 A | * | 9/1998 | Sloane et al. ................ | 434/236 |
| 6,968,272 B2 | * | 11/2005 | Knockeart et al. ........... | 701/210 |
| 6,970,783 B2 | * | 11/2005 | Knockeart et al. ........... | 701/201 |
| 6,978,193 B2 | * | 12/2005 | Kamon et al. ................ | 700/245 |
| 7,027,032 B2 | * | 4/2006 | Rosenberg et al. .......... | 345/156 |
| 7,039,866 B1 | * | 5/2006 | Rosenberg et al. .......... | 715/701 |
| 7,091,948 B2 | * | 8/2006 | Chang et al. ................. | 345/156 |

OTHER PUBLICATIONS

Application of Dynamic Route Selection Model in Urban Transportation Distribution Liu Xiao-Ian; Cheng Wei; Measuring Technology and Mechatronics Automation, 2009. ICMTMA '09. International Conference on vol. 3, Apr. 11-12, 2009 pp. 486-489 Digital Object Identifier 10.1109/ICMTMA.2009.562.*

* cited by examiner

*Primary Examiner*—Michael B Holmes
(74) *Attorney, Agent, or Firm*—Leyendecker & Lemire, LLC; Kurt Leyendecker (57) ABSTRACT

In embodiments of the present invention, a method and system for recording and mapping information and data is described. The system (or intellect map) comprises paths of steps of thought organized into structures comprising two or more paths. The structures each comprise a relatively small number of predefined points of entry and exit wherein the exit and entry points can be but do not necessarily comprise the same intersection points. In some embodiments, a plurality of structures can be connected to each other by way of appropriate entry and exit intersection points with or without intervening connecting paths to form complex structures.

20 Claims, 9 Drawing Sheets

METHOD AND SYSTEM OF ORGANIZING INFORMATION BASED ON HUMAN THOUGHT PROCESSES

FIELD OF THE INVENTION

The present invention relates generally to methods and systems of capturing, mapping and disseminating human intelligence.

BACKGROUND

Information and its availability and accessibility to as many people as possible are instrumental to societal advancement. The advancement of the human civilization over the last 500-600 years can in a large part be attributed to the development of the Guttenberg press and the subsequent availability of printed books to the masses of Europe. Closer to home, the Revolutionary War and independence from Great Britain can in part be attributed to pamphleteers and their persuasive effect on a significant portion of the population.

The advent of the library making access to book and other written materials available to people of all social economic classes helped fuel technological development during the industrial revolution.

And as more and more information was created and became available to people, advancement in the means of organizing and providing access to information has advanced as well. In the last two decades the importance of libraries has begun to fade as the Internet has become a primary means of information retrieval and dissemination. Within the current decade, the advent of high speed wireless communications has literally put more information than has ever been stored in the largest libraries at a person's fingertips through laptop computers, PDAs and Smartphones no matter where the person is located.

Whereas, technological and societal advancement in the past was determined largely by the access to information and its availability to large portions of the population, the exponential growth of information has potentially created a new barrier: the difficulty of finding and locating particular pieces of reliable information concerning a topic or issue in the shear volume of information that may be available for the particular topic or issue. Often the hunt for information can be likened to the proverbial cliche of finding a needle in a haystack. In short, too much information can be too much of a good thing. In developed areas of the world, the focus has shifted from providing wholesale access to information to providing better means for accessing high quality and reliable information. The challenge is to organize the large volume of information available in such a way that what is not meaningful to each reader is filtered out in a customized fashion without the reader having to make too many decisions.

In the past decade or two, Knowledge-based Expert Systems have been developed that utilize a combination of rules and data to solve problems and relatively quickly disseminate specific high quality information to an interested person. Books and manuals require shifting through a significant amount of needless information to find the piece required by a person for a particular need. In contrast, Expert Systems based on contextual data provided to it quickly apply rules to filter the data and deliver the specific information required by a requestor. Or at least the foregoing is a promise offered by Expert Systems: a promise that has largely remained undelivered.

Figure 1:
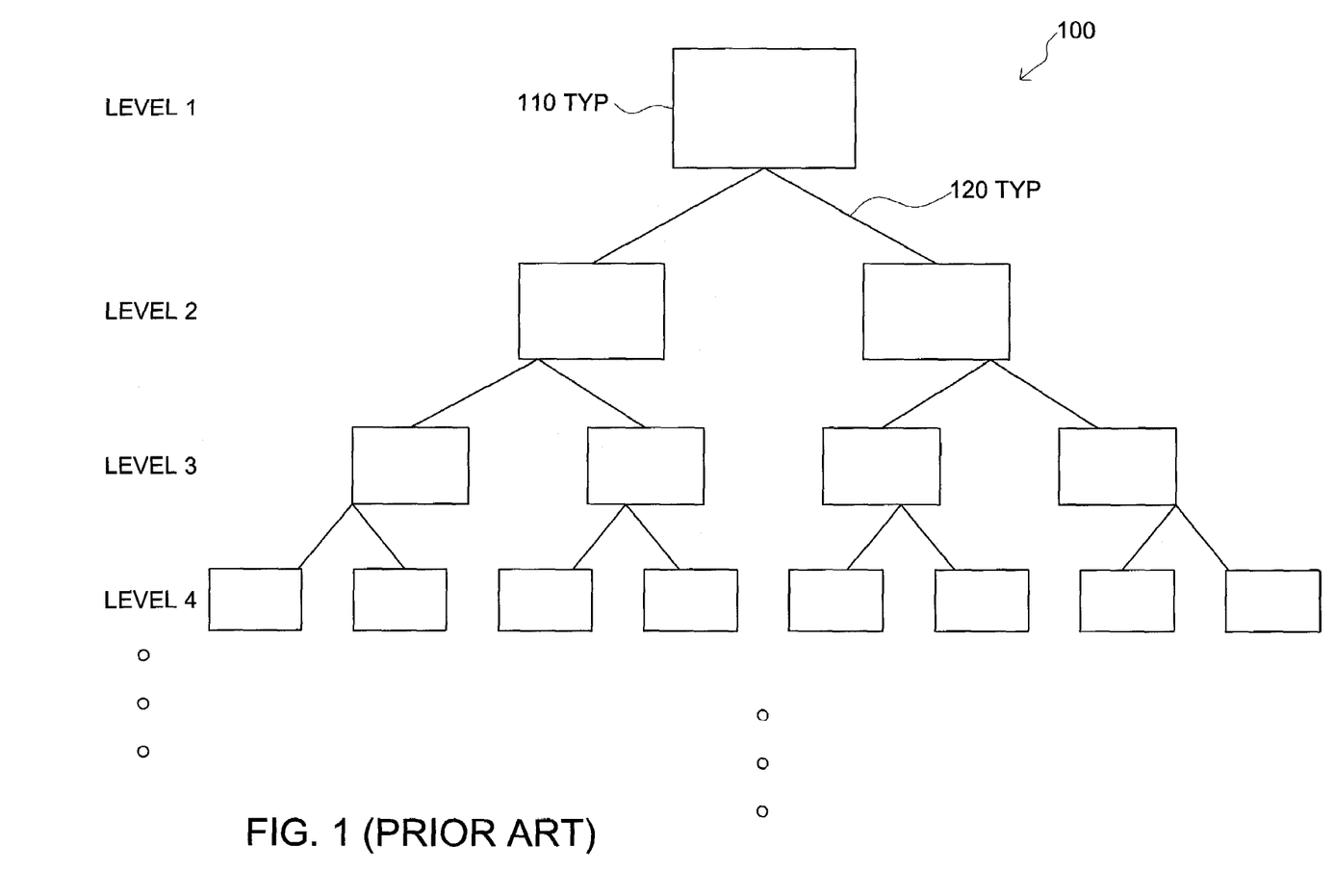
FIG. 1 is a block diagram illustrating a prior art decision tree.

Widespread acceptance of expert systems has been hindered by several problems or issues. Unfortunately, Expert Systems can become very complex very quickly making the entry of quality information in a logical manner very difficult and time consuming as well as taxing the computational capabilities of all but the most powerful information systems. Referring to prior art FIG. 1, and outline of a simple decision tree 100 is provided. Decision trees are often utilized in simpler Expert Systems as a framework for the data and rules. Each box 110 represents a decision point wherein based on the resolution of a rule associated with the decision point, the Expert System moves to the next decision point/box by way of an associated link 120. As becomes clear from FIG. 1, the number of outcome permutations explode as the Expert System travels deeper into the tree. For a tree wherein each decision point has X possible choices, the number of outcome permutations for any particular decision tree is equal to X raised to the number of levels in the tree. For a simple tree having only two possible choices for any decision point: a five level tree has 32 possible outcomes; a ten level tree has 1024 outcomes; a twenty level tree has over one million outcomes; and a thirty level tree has nearly one billion outcomes. Furthermore, to solve complex problems or issues, large numbers of decision points and consequently levels are often required.

Obviously the quality of the information provided by an expert system is only as good as the person(s) providing the information: an expert must compile the data and rules (alone or working with computer professionals). While a person can immediately remember a chain of decisions a few levels back from any decision point within a tree, it is difficult if not impossible to recall all the decisions made to come to a decision point many levels deep in the tree. Accordingly, the process of populating a tree from a level deep within the tree often requires tracing back through the levels for each and every decision point at a particular level. Simply the process is very tedious and time consuming. In the end, producing complex trees having more than only a few levels becomes impractical.

Simply, decision trees and related Expert Systems map data in a manner that is very different from the way people think and reason. Rarely do people make decisions for each element of thought that pops into their heads. Rather, a person tends to think habitually following a path of thought linearly. Simply for a person, multitudes of decision points do not exist for each and every issue or conflict as they have been long resolved based on a multitude of life experiences. Over the years we refined our habits of thinking as paths of thought are regularly applied and tested to the questions we have to consider. Our habitual paths of thought become extremely reliable resources and we call upon them instinctively as established dispositions to confronting issues or solving problems. Occasionally, during a stream of consciousness when the human mind makes a decision it simply switches from a largely linear path to another linear path that is often related to the first. Furthermore, habitual paths of thought can merge or flow back into other habitual paths without conflict or inconsistency. Switching between paths of thought from one topic to another is seamless.

Decision trees and associated Expert Systems do not permit switching between topics or issues from within a tree. A decision tree can only be entered at its beginning at its first level and must be traversed all the way through before being exited. If a tree is left at some point midway through the tree to follow another tree concerning a related issue or concern, upon completion of the other tree, the first tree must be entered back at its beginning so that every decision made at decision points prior to the decision point of departure can be verified as true. Essentially, nesting more than one tree just creates a larger single tree further complicating the problems of the tree's size and unmanageability.

Because of the problems with decision trees and associated Expert Systems, they are not well suited to certain type of information dissemination tasks, such as making information more meaningful to a person. Simply, decision trees and Expert Systems are best suited to solving concrete problems with definite answers that logically flow together. Decision trees become very difficult to manage when there are too many nodes and when there are a large number of possible answers within the nodes that may have only a slight variation in their meaning. People tie together information in a multitude of ways that are both logical and emotional. A person may answer a question in many different ways that have only are slight variations in their content. To use a decision tree to express this way of thinking is very difficult since one quickly encounters exponential growth in complexity due to slight variations in answers people may give. These slight variations significantly impact how meaningful the answer is to the person, but the increased number of possible answers greatly complicates the decision tree. In addition the order in which questions are considered by a person can greatly impact the emotional response. If a decision tree needs to factor in all the possible permutations of how questions can be ordered one again faces a serious complexity barrier. When an issue is not concrete, such as would be the case with a societal or political issue, a more meaningful presentation of the issue to the person often requires the factoring of a person's particular beliefs, habits and prejudices. There are so many variations in these factors that a decision tree is ill equipped to deal with the number. A person finds information more meaningful when they are enabled to think in his/her own fashion at his/her own speed without the constant prodding to make decisions however small. The structure of a decision tree does not approximate this manner in which a user thinks and a new approach is required to map in a more agile and flexible way what really goes on in a person's mind. Further, Expert Systems are typically concerned only with the logic of a position not the person's emotional response to how the Expert Systems are presenting the position.

DETAILED DESCRIPTION

In embodiments of the present invention, a method and system for recording and mapping information and data is described. The system (or intellect map) comprises paths of steps of thought organized into structures comprising two or more paths. The structures each comprise a relatively small number of predefined points of entry and exit wherein the exit and entry points can be but do not necessarily comprise the same intersection points. In some embodiments, a plurality of structures can be connected to each other by way of appropriate entry and exit intersection points with or without intervening connecting paths to form complex structures.

The structure of the intellect map approximates the manner in which a person thinks, linearly along habits of thought. Advantageously, the method of creating intellect maps is more intuitive than decision trees and other similar Expert Systems, which have structures more akin to the manner of operation of binary digital devices. Since each step of thought does not require a rule associated with the step in contrast to decision points in decision trees, an expert can record and map his/her intellect without undue concern about violating semantics concerning the organization of the information. Rather intersection points are associated with thought steps whenever and wherever the expert deems appropriate. For paths of thought outside of an expert's expertise or intent of the particular structure, an intersection point can be provided that permits an exit from the particular structure to link with another structure that pertains to the specific issue or area that the expert desires the user of the system to obtain more information about. The expert can link the user back into the particular structure when he/she reaches a predetermined exit point of the other structure. The re-entry point can be the same as the exit intersection point or it can be in another step of thought altogether.

In other variations and embodiments of the present invention, the manner in which each user traverses an intellect map is recorded. Based on the user's responses to questions at intersection points, and the paths traversed by the user, the thoughts of the user as they progress through the map can be determined. In some variations, the users may be able to leave comments for the expert concerning the information provided in a step of thought and/or questions provided at intersection points. Based on the responses from a plurality of users provided over time (optionally although often not in conjunction with demographic data about the users), the effectiveness of the intellect map as a whole or in part can be ascertained. For example, some paths may not be traversed very often and the expert may decide to eliminate the path altogether. Or user data may indicate that a certain path does not invoke the desired emotional and meaningful response from users due to how it is presented and accordingly the expert might modify his/her delivery of information for greater effect. Written comments provided by the users may be used to correct or modify steps and or intersection point inquiries. New paths of thought may be required to address issues not included or anticipated in the original intellect map.

Embodiments of the system and method offer advantages over more traditional means of disseminating information, such a written materials and websites, by permitting the information to be tailored to the particular needs of the user by hiding information that is irrelevant to the user. In contrast books, other written materials and websites do not filter material often requiring the user of the material to read extraneous information.

Consider the following example as discussed again below wherein an expert is tasked with persuading people that the death penalty should be abolished. The expert must consider the numerous reasons people are for the death penalty and provide arguments that rebut each reason. If the expert presents his argument in essay or magazine article form, he will have to address and include rebuttals to each and every reason. The reader of the essay may lose interest in the essay if the arguments presented initially are not related to his/her reason(s) for being pro death penalty. He/she may not continue to read to find the portion of the essay that addresses his/her reasons. Even worse, the reader may be angered and/or annoyed by something the expert wrote rebutting a reason that does not particularly concern the reader, thereby reducing the expert's overall credibility. Accordingly, the expert's rebuttal arguments to the reader's particular reason may not be given proper consideration.

Websites and web pages can be better tailored and organized to direct a user to the proper information through the use of hyperlinks and indexing; however these are in effect very rudimentary decision trees which only factor in the previous decision of the user. This mechanism suffers a more server form of the complexity barrier that sophisticated decisions tree have and users will likely follow paths unrelated to his/her positions and could become negatively prejudiced.

Embodiments of the invention relate generally to the efficient capture and dissemination of information and can be utilized in any number of ways as would be obvious to one of ordinary skill in the art given the benefit of this disclosure. For instance, embodiments of intellect maps can be used to persuade and advocate (as indicated with the death penalty example) presenting only the information to a user that is relevant and tailored to the user's particular viewpoint and reasoning.

Embodiments can also be used as preparatory tools. For instance, an attorney could prepare a map concerning the potential avenues of cross examination of his/her witness and the potential paths created during the lines of questioning. The map can be provided to the witness to traverse the map in different manners to see how the various answers to potential questions could affect the direction of cross examination. The witness can prepare on his/her own time as many times as desired without the lawyer present.

Embodiments can also be used for the delivery of more meaningful news. For instance, a news website could present more relevant information to users based off how they have interacted with maps on the site before. The map could factor in the user's emotional and logical reactions to previous content to help determine what information would be more meaningful to the user going forward.

As presented herein, embodiments are generally described in relation to visual presentations of data and information, such as on a computer screen. It is to be appreciated that variations of the invention are contemplated wherein audible and other tactile means are used in place of visual means to convey information and data.

Terminology

The terms and phrases as indicated in parenthesis (" ") in this section are intended to have the meaning ascribed to them in this section applied to them throughout this document including the claims.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

A "step" as used herein refers to a thought that has data associated with it wherein at least a portion of the data is in a format to facilitate dissemination to a user.

A "thought" as used herein is an element of knowledge.

A "path" as the term is used herein refers to a linear sequence of a plurality of thought steps that flow after each other without the need to incorporate any decision logic, such as decisions, rules or any artificial intelligence (AI) mechanism.

A "structure" as used herein refers to two or more paths that are linked together. The links occur at intersection points.

An "intersection point" as used herein refers decision logic that determines where to direct a user from an associated step to another step in another path (or to a non adjacent step on the same path) through one or more "intersection link(s)" that are associated with the intersection point. "Intersection points" and "intersection links" facilitate the navigation between two or more paths in a structure or between structures.

A "complex structure" as used herein is created when (i) a structure is extended with paths outside of its defined boundary or (ii) if paths in two or more structures are linked together at the entry and exit locations by way of one or more intersection points and intersection links.

A "map" or "intellect map" refers to any combination of paths, structures and complex structures provided for a particular purpose through which a user can navigate and access information and data.

An "entry location" as used herein refers to a step wherein a user enters into a structure and/or complex structure. Every structure and complex structure has a predetermined number of entry locations and at the least must have one entry location.

An "exit location" as used herein refers to a step wherein a user exits out of a structure and/or complex structure. Every structure and complex structure has a predetermined number of exit locations and at the least must have one exit location.

A "default linkage" is a link from a terminal or last step in a particular path where the terminal step is not an exit location to another step in another path that is activated either in the absence of intersection point logic or if the conditions relating to an intersection point logic decision are not satisfied to transport a user by way of a intersection link.

A tracking module as used herein refers to any subroutine, object, code or other software construct that monitors and tracks a user's navigation through an intellect map. The tracking module may, but need not, (i) perform statistical analysis on the navigation of a plurality of users, and (ii) log comments, questions and answers provided by users in response to associated links and prompting.

An Exemplary Computer System

Figure 2:
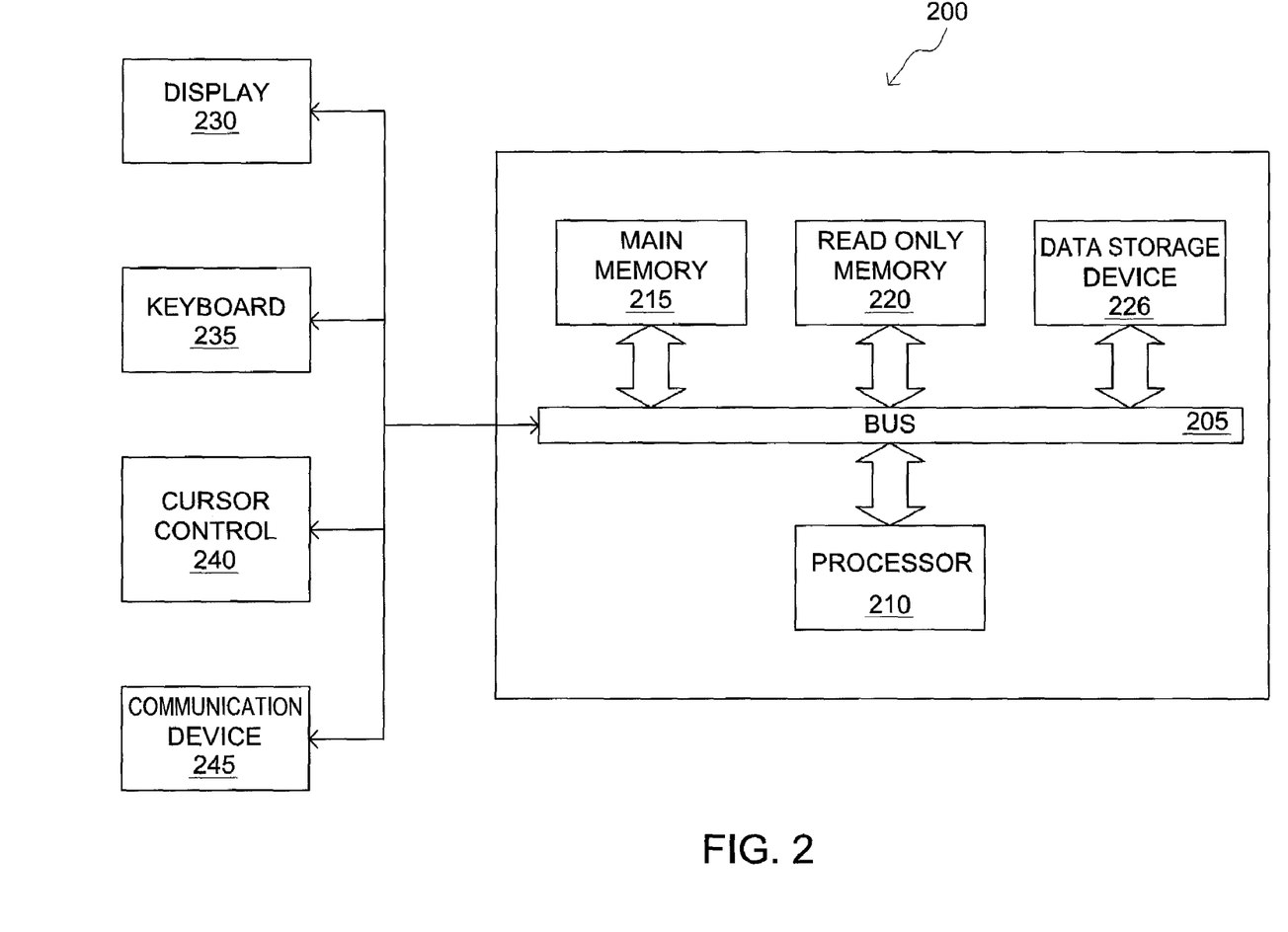
FIG. 2 is a block diagram of a typical computer system.

FIG. 2 illustrates an exemplary computer system 200 upon which embodiments of the invention may be implemented. The computer system can be utilized as a server upon which intellect maps reside or the computer system can be a client wherein a user accesses an intellect map and views it. A single computer system can also be utilized where it acts as both a server upon which the intellect maps reside and as a client wherein a user accesses an intellect map and views it. Further, while intellect map embodiments may be provided over servers connected to a network, such as but not limited to the Internet, intellect map embodiments can also be provided as stand alone files. If a user cannot connect to a network and wishes to access an intellect map in a disconnected mode without installing the server software on the client computer, a static version can be produced where all the possible ways of navigating the map are preprocessed into files and are connected together with static navigational and intersection links. The navigational and intersection links in this static version can be encrypted along with any sensitive data, to secure the intellect map files from unauthorized use. This static version can also be downloaded from a server, if so desired.

The computer system typically comprises a bus 205 or other communication means for communicating information, and a processing means, such as a processor 210, coupled with the bus for processing information. The computer system further comprises a random access memory (RAM) or other dynamically-generated storage device 215 (referred to as main memory), coupled to the bus for storing information and instructions to be executed on by the processor. The main memory 215 may also be used for storing temporary variables or other intermediate information during execution of instructions by the processor. The computer system also typically comprises read only memory (ROM) 220 and/or another static storage device coupled to the bus 205 for storing static information and instructions for the processor.

A data storage device 225, such as a magnetic disk or optical disk and its corresponding drive or a flash memory storage device may also be coupled to the computer system 200 for storing information and instructions. The computer system can also be coupled via the bus 205 to a display device 230, such as a cathode ray tube (CRT) or Liquid Crystal Display (LCD), for displaying information to an end user. Typically, an alphanumeric input device (keyboard) 235, including alphanumeric and other keys, may be coupled to the bus for communicating information and/or command selections to the processor 210. Another common type of user input device is cursor control device 240, such as a mouse, a trackball, a trackpad or cursor direction keys for communicating direction information and command selections to the processor and for controlling cursor movement on the display.

A communication device 245 is also coupled to the bus 205. The communication device may include a modem, a network interface card, or other well-known interface devices, such as those used for coupling to Ethernet, token ring, or other types of physical attachment for purposes of providing a communication link to support a local or wide area network, for example. The communications device may also be a wireless device for coupling to a wireless network.

It is appreciated that a lesser or more equipped computer system than the example described above may be desirable for certain implementations. Therefore, the configuration of computer system 200 will vary from implementation to implementation depending upon numerous factors, such as its intended use, price constraints, performance requirements, technological improvements, and/or other circumstances.

It should be noted that while the embodiments of the intellect map system and method described herein may be performed and used with a computer similar to the one described herein, other embodiments and variations can be used with other information devices, such as but not limited to PDAs, Internet Appliances, and telephonic communications systems. Therefore, nothing disclosed herein concerning the configuration of the illustrated computer should be construed as limiting the present invention to a particular embodiment wherein the recited operations are performed by a specific combination of hardware components.

An Exemplary Network

Figure 3:
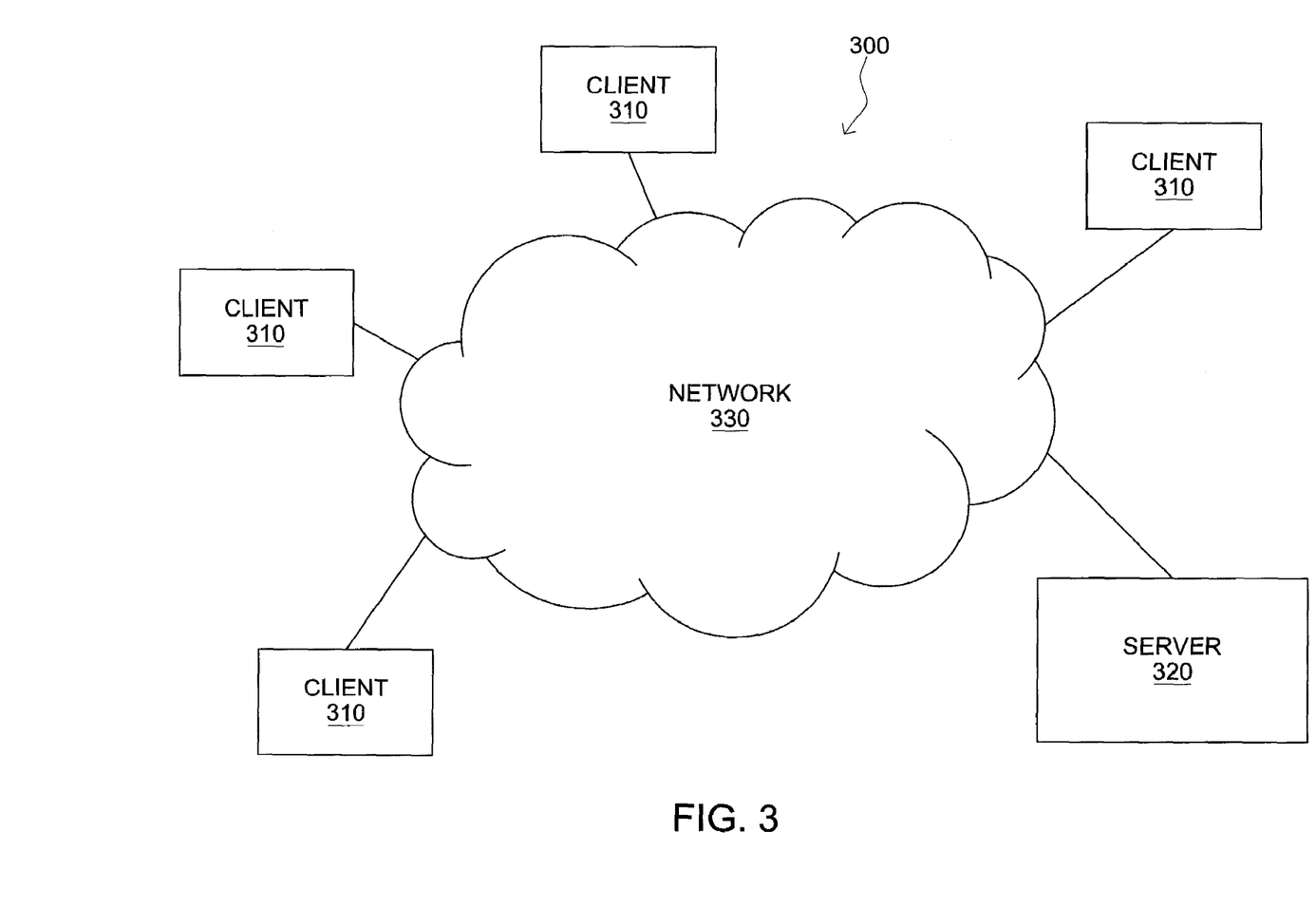
FIG. 3 is a block diagram of a computer network.

FIG. 3 illustrates an exemplary network in which embodiments of the present invention may be implemented. Simply, the network comprises client computers 310 and one or more server computer(s) 320 that are interconnected through a suitable network connection 330, such as the Internet or an intranet. Both the server and terminal computers can be similar to the computer system described above concerning FIG. 2.

In certain embodiments, an intellect map can be stored on a server computer 320 and transmitted to a user located at a client computer and displayed or otherwise broadcast thereon. The entire map can be sent as a file to a user for display and navigation wholly on the client computer, in other variations the file can remain on the server with only the data and information concerning a current step being sent to the client computer, or in other variations the map can be provided in a combination thereof. In some variations, the primary means of displaying and disseminating the information and data associated with steps of the map is through a web browser; however, other suitable dissemination software or hardware can be used as well.

An Intellect Mapping System According to one Embodiment of the Present Invention FIGS. 4-7 are graphical illustrations of exemplary structures, complex structures and components according to one embodiment of the present invention as can be utilized with the intellect mapping system and method.

Figure 4:
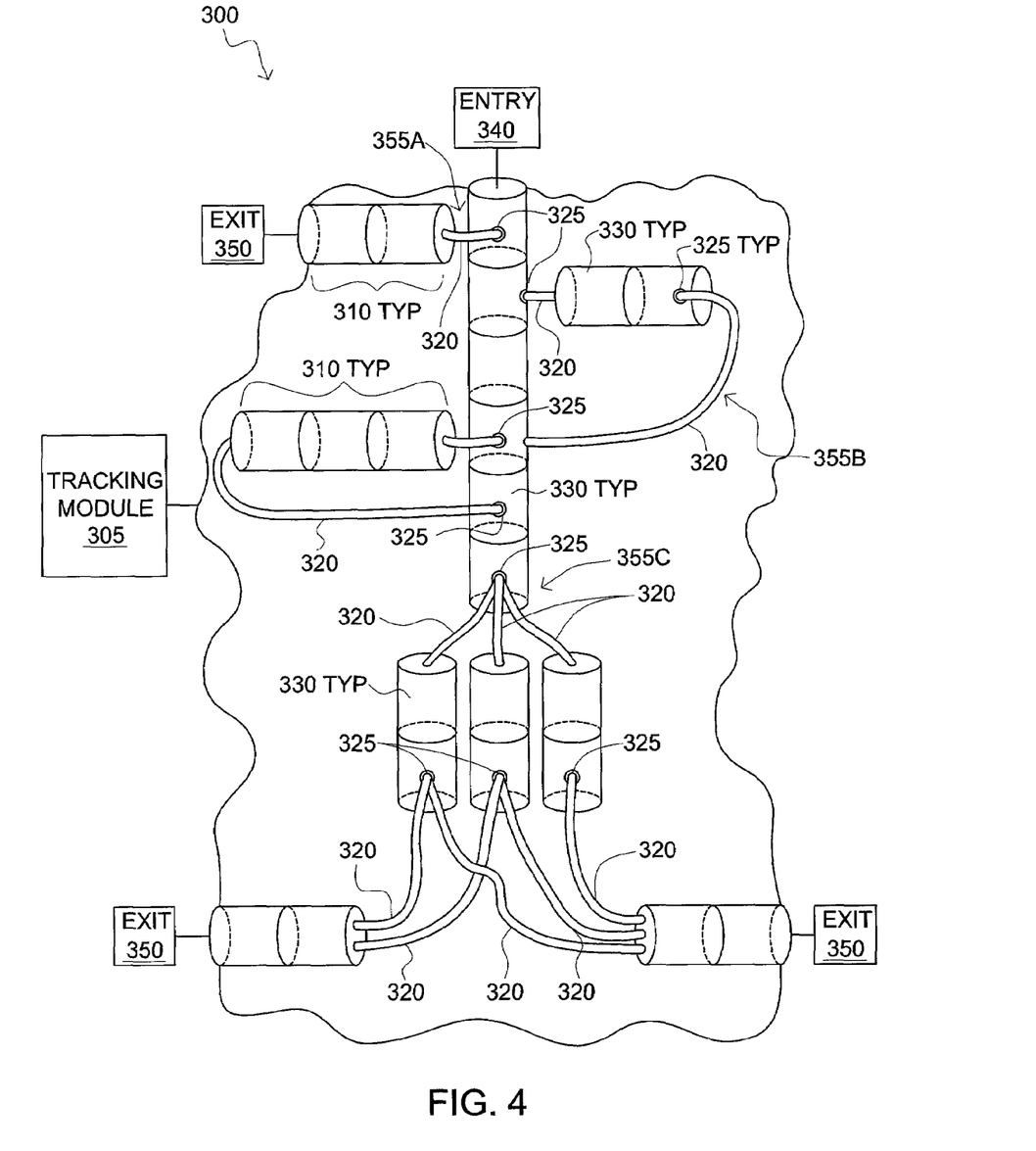
FIG. 4 is a representation of a structure according to one embodiment of the present invention.

An exemplary structure is illustrated in FIG. 4. It comprises a plurality of paths 310 linked together by one or more intersection links 320 by way of intersection points 325. Each path comprises a plurality of steps 330 that provide a substantially linear progression from one end of the path to the other.

Every structure 300 must have a predetermined set of one or more entry locations 340 and a set of one or more exit locations 350. Only through an entry location, which typically comprises a first step 330 in a path 310 located in the structure, may a user enter the structure and access the information and data contained therein. Similarly, once a user is within the structure, he/she cannot exit the structure except through an exit location, which typically comprises a last step in a path within the structure.

A step 330 is the primary building block of a path 310. A step preferably comprises a single unitary thought with data and information associated with the thought. Typically and preferably, a step does not incorporate any decision logic, such as decisions, rules, or AI mechanisms that relate to the movement of a user through the path associated with the step. Other than the last step in a path, a link or other navigational aid will typically be provided to advance a user to the next step along a path. Typically, the last step will have an intersection point 325 with its associated intersection link 320 to direct a user to another path and/or to an exit location 350 of a structure 300.

Figure 7:
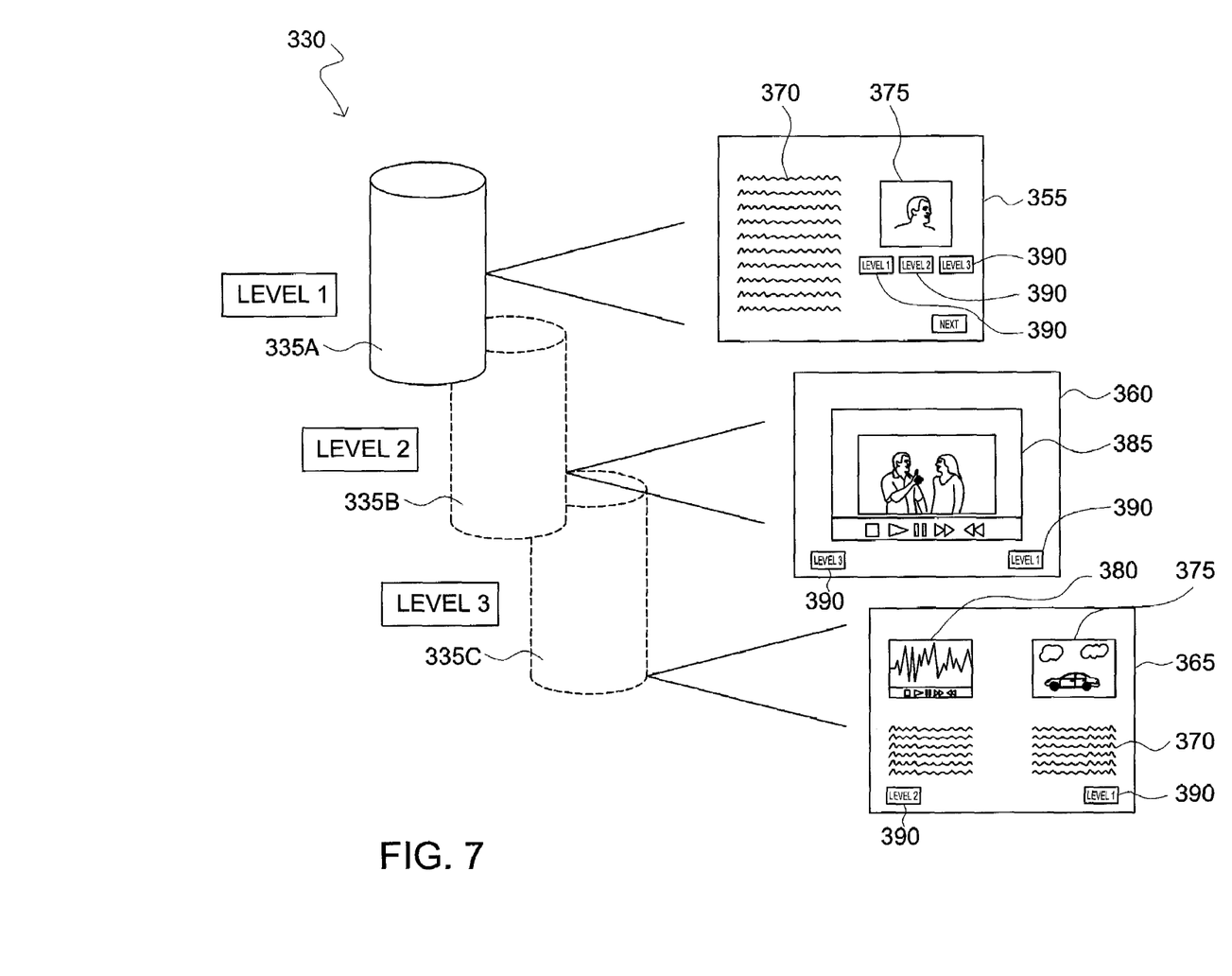
FIG. 7 is a representation of a step according to one embodiment of the present invention.

In its simplest form, a step 330 will comprise a single displayed page or pane of information or data. However, in other variations as indicated in FIG. 7, a step may include multiple levels 335A-C presented in one or more pages 355, 360&365. Often deeper levels within a step can be accessed through hyperlinks 390, which also typically provide a means for returning to the first or primary level 335A. In addition to text, information relating to the step's thought displayed on a first or any deeper level can include, but is not limited to, images 375, audio 380 and video 385.

In addition to information and data, questions may be provided in one or more levels 335A-C along with a selection of answers from which the user can choose. The user may also be prompted to input data which can be used for calculating more information for the user though the use of formulas or data generation. The answers to questions might be used to link a user to another level within the step 330. In preferred variations of embodiments of a structure 300, the answers chosen by a user are recorded, along with tracking data concerning the manner in which the user navigated the step or interacted with the information such as hyperlink selection or data entry, by a tracking module 305 of the intellect mapping embodiment for analysis and other suitable purposes.

Further, a user may be prompted and provided text boxes or other suitable mechanisms to provide input and suggestions to the creator or administrator of a particular map. The comments, input and suggestions can be used by the creator and/or administrator to improve a step 330, path 310, structure 300 or the entire map in the future. Additional optional features of a step can include indicators concerning the particular step a user is located in relative to a particular path as well as the level within the step that the user is located.

As stated above, a path 310 comprises two or more steps 330 that are linked together serially. Like steps, paths need not incorporate any decision logic, such as decisions, rules, or AI mechanisms within it to facilitate a user's navigation through the path. Simply, a user entering a path at any step along the path will be able to sequentially move to each succeeding step until reaching the end of a path. In some variations, a hyperlink or other suitable mechanism may be provided along a path to allow a user to travel backwardly along the path in addition to forwardly.

While a path 310 does not require outside logic to facilitate its navigation, intersection points and links 325&320 can be associated with a path at any step 330 facilitating a user's deviation from a path's linear progression depending on the intersection point's particular predetermined logic as programmed by a map's creator and/or administrator. It is further appreciated that an intersection link can place a user at any desired step within a path from another path upon the satisfaction of the associated predetermined logic.

Similar to the tracking of a user's navigation behavior within the levels of a step, the tracking module 305 of a particular map can track the manner in which a user navigates through a path particularly in relation to deviations from the path as prompted by intersection point logic.

An intersection point and link 325&320 are typically required anytime two or more paths are connected to facilitate directing a user from any step in one path to any step in another path. Similarly, intersection points and links can also be utilized in complex structures (as described in greater detail below) to join an exit location 350 step of a first structure with an entry location 340 of another structure. Further, an intersection link in a complex structure can link a step at an exit location of one structure with a step on a path occurring outside the structure or vice versa. Each intersection point contains logic where one or more decisions are evaluated in order to determine the next path and step within the next path with which to direct the user via an associated intersection link. The decision logic can be the evaluation of simple rules or more complex AI mechanisms.

For instance, the logic can be as simple as directing a user to a particular path 310 based on a particular answer to a question provided by the user. For example in an intellect map concerning the anti-death penalty advocacy, a user may be asked whether or not he/she believes the death penalty deters crime. If the user answers yes, he/she may be directed to a path that provides an argument that the death penalty does not deter crime; whereas, if the user answers no, the user may be directed to continue along the present path to the next step. In some variations utilizing intersection point logic that requires a user decision, the intersection point may also include data which can provide an explanation of the decision. The user can request this data to better understand the reasoning behind particular questions and its answers.

In contrast, the decision logic can be quite complex. The logic algorithm could factor any number of parameters into determining where to direct a user, such as, but not limited to: (i) the manner in which the user has navigated an associated structure or complex structure; (ii) answers to questions provided in any of the steps within the structure or complex structure; and (iii) the time the user has spent in various portions of the map.

Referring primarily to FIG. 4, three different types of intersection point and link combinations 325&320 are illustrated; however, additional combinations may be possible as would be obvious to one or ordinary skill in the art given this disclosure. A first combination 355A comprises an intersection point that applies logic to determine whether to direct a user to a new path 310 or to permit the user to continue his/her linear progression down the current path.

A second combination 355B occurs at the last step of a path and either directs a user to a new step in a new path or directs the user to a default step via a default linkage (not illustrated) if the logic of the associated intersection point is not satisfied. A default linkage prevents a user from becoming trapped in a structure by always directing him/her to a step that includes or leads to an exit location 350 of a structure.

A third combination 355C includes a plurality of intersection linkages 320 associated with a particular intersection point 325 wherein the predetermined logic directs the user to one of the plurality of linkages. Where this type of combination occurs at the last (or terminal) step 330 of a path, a default linkage (not shown) is also present.

In some embodiments and variations of an intellect mapping system, additional logic is associated with the map and or structure that will hide steps within a particular path that the user has already traversed so that the user is not unnecessarily exposed to the same information more than a single instance. For instance, a particular intersection point on a side path may send a user back to a step in a primary path that is in front of steps already traversed by the user. The logic associated with the intersection point may query the tracking module 305 and hide any steps in the primary path the user has already seen.

Every structure 300, such as the one illustrated in FIG. 4, is self contained and does not require any additional data, information or logic from outside the structure to manage and facilitate the navigation of a user through the structure. Accordingly, a person creating an intellect map can use these self contained structures when creating his/her own complex structure. Again considering the anti-death penalty example, the creator may want user to receive more information concerning life after death. If the creator is not an expert in this area, he/she will likely be unable to create a structure dealing with this issue. However, he may be able to find such a structure created by an expert in the topic, such as a theologian. To utilize the structure in conjunction with his/her death penalty structure, he/she need only know (i) the topic taught, considered and/or examined by the structure as would be typically indicated in relation to a structure's entry location, and (ii) information ascertained about the individual based on where a user leaves the structure at certain exit locations.

For example, the life after death structure may help a user examine his/her beliefs concerning an afterlife. The creator of the death penalty map may want users who are unsure a murder's judgment after death to consider their beliefs about life after death in general. The creator may also want to learn the user's particular beliefs about life after death so that he/she can direct the user down the most suitable paths in the map to address the user's particular point of view concerning the death penalty. Users that do not believe in life after death may leave from one exit location; whereas, users that believe in life or death but not the traditional Christian sense of Heaven and Hell may leave out another exit location. Other users may leave out of a third exit location that indicates that they believe in the Heaven and Hell, or a fourth exit indicating a belief in reincarnation. The number of exit locations and information it provides about a particular user is determined by the life after death structure's creator.

The creator of the life after death map will typically connect his structure or paths directly with each exit location usually by way of an intersection point and intersection link. As will become apparent below, the creator does not always need to utilize an intersection point at a structure's exit location. The user that does not believe in life after death might be put on a path that presents arguments and information that consider the ramifications of the death penalty as it relates to the finality of the action of putting someone to death. Whereas, a user who believes in life after death would be sent down another path to consider how the afterlife pertains to the decision to execute a criminal.

As defined above, any combination of a self-contained structure 300 and additional connected pathways or other structures is a complex structure 400. Two types of exemplary complex structures 400A&400B are illustrated in FIGS. 5&6.

Figure 5:
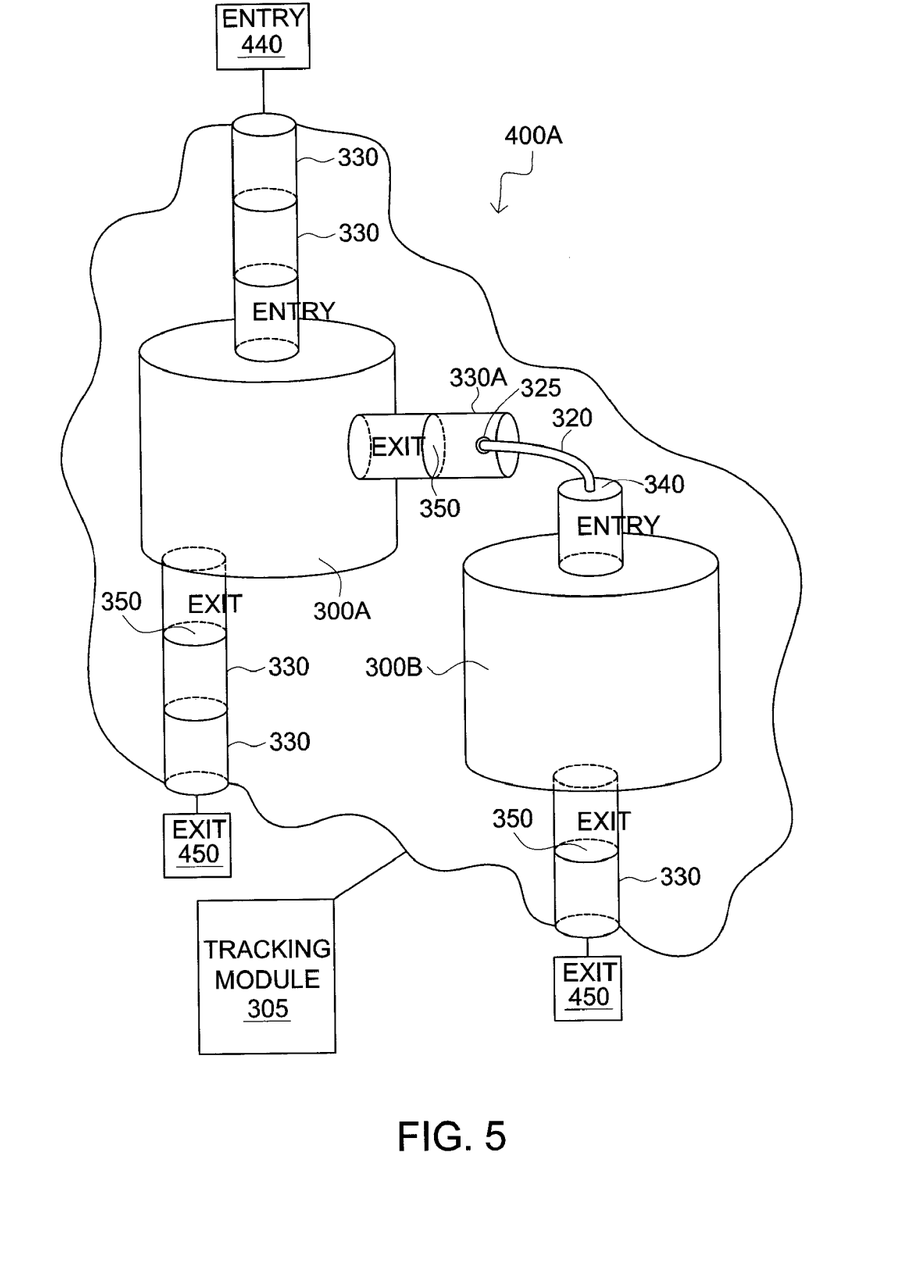
FIG. 5 is a representation of a first type complex structure according to one embodiment of the present invention.

FIG. 5 essentially comprises two separate and distinct structures 300A&300B that are connected by way of an intersection point and link 325&320. As shown an additional intermediate step 330A has been added to the exit location step of the first structure 300A and that the intersection point is associated with this additional step. An intermediate step can be, but need not be, utilized in certain complex structures to provide transition information to the user otherwise the transition between structures may appear to the user as being somewhat disjointed. Of course, in other variations, the transition may be more seamless and will not require a transition step(s).

Figure 6:
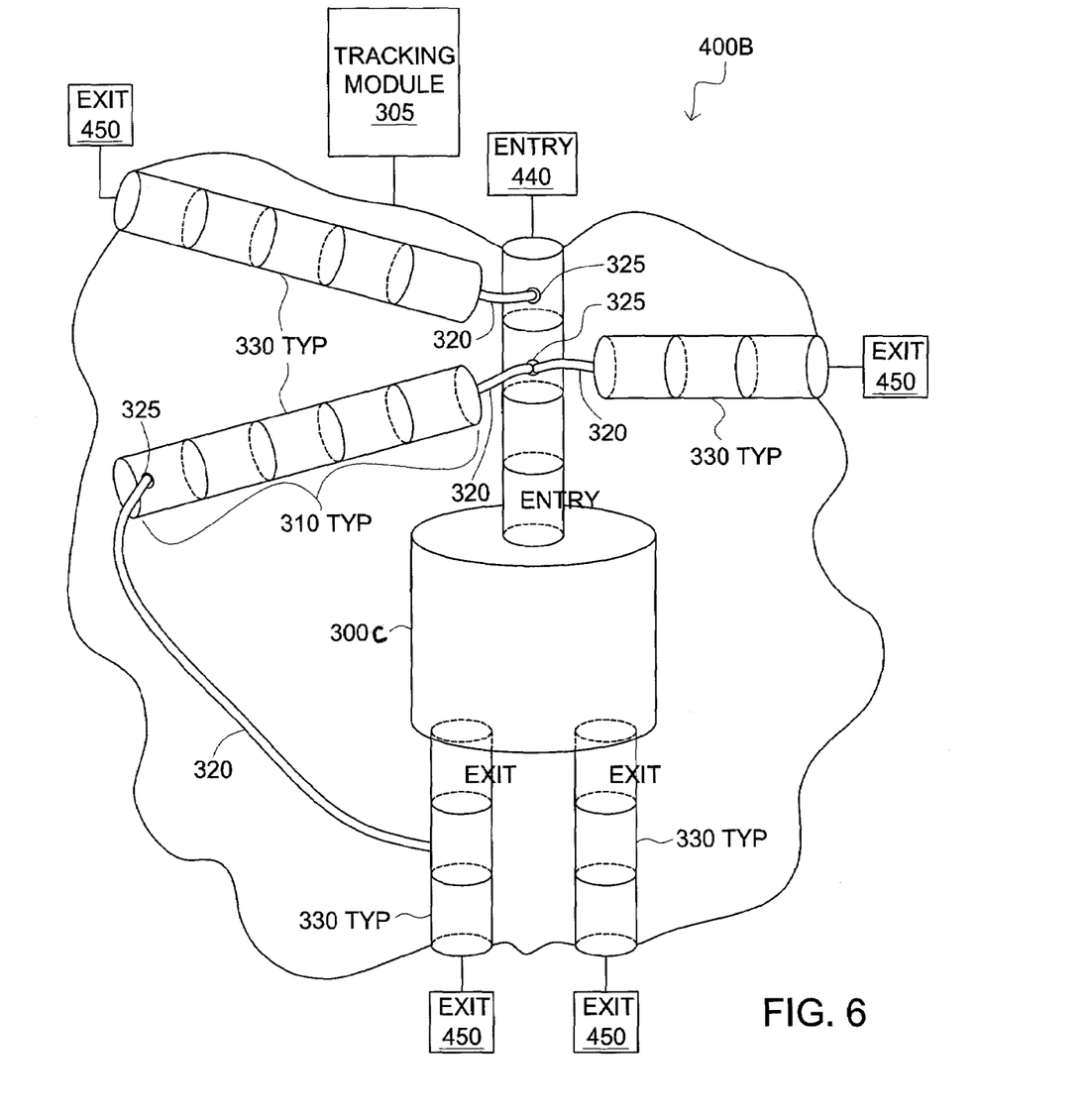
FIG. 6 is a representation of a second type complex structure according to one embodiment of the present invention.

FIG. 6 illustrates a complex structure including a single inner structure 300C having a number of paths and associated intersection points and links extending outwardly of the inner structure. This type of complex structure can be also described as a pair of nested inner and outer structures with the outer structure comprising the paths and intersection points and links occurring outside of the inner structure.

Similar to structures, complex structures 400 are self contained each having a predetermined number of entry and exit locations 440&450 analogous to entry and exit locations of a structure. As also illustrated, the steps and associated paths of the exit or entry locations can be extended as desired by the creator as necessary to create a complex structure that serves the creators purpose. Like structures 300, a default linkage is provided at the last step in any path of the complex structure except for those paths ending at exit locations 350&450. Accordingly, if a user enters a complex structure then they will always be able to leave through one of the defined exit locations regardless of the applicability of intersection logic. This ensures that users never get trapped in a complex structure.

As would be obvious to those of ordinary skill in the art, there are an innumerable number of different types and variations of complex structures possible as would be obvious to one or ordinary skill in the art given the benefit of this disclosure. For instance, any number of levels of structures could be nested within each other. Other complex structures can comprise any conceivable combination of nested and connected structures. Further, structures can have multiple instances of the same paths within their boundaries and complex structures can have multiple instances of the same structures within their boundaries.

As discussed above, a tracking module 305 can be provided in embodiments and variations of the intellect map that tracks a user's movement through a map as well as information related to step and intersection point questions provided by the user. Based on this information a map administrator can learn the feelings, thoughts and opinions of the user. As a user reads the map and gains information, the map reads the user. In real time based on intersection point logic, the data generated on a specific user is used to direct the user through the map to areas of the map that are potentially of greatest interest to the user while hiding areas of the map that have low relevance to the user.

The creator or administrator can use the data generated concerning a particular user to better understand the user and better prepare the user for a particular task, such as with versions of the map utilized to prepare witnesses for cross examination.

Also the data from many users can be used with statistical analysis software to determine the affect of a map and particular sections of a map on the users. For instance some arguments presented by a creator in a path on the death penalty map may not persuade many users who traverse the path, and accordingly, the creator can modify the argument for a better response. Over time, a creator can hone and optimize his map to ensure that most users perceive the content to be meaningful and persuasive to them even though they may have very different ways of reacting to the subject matter. Further based on the reactions and effectiveness of the map and structures and paths therein, the creator can use the information outside of the map setting to more effectively persuade and inform. For instance, the death penalty map creator may determine that a particular argument resonates more strongly with people who have a strong religions conviction. The creator can consider this information when writing a speech he/she might give to an audience he/she knows or suspects is religious.

As also indicated above, a user can in certain embodiments and variations be given the opportunity to provide written questions, comments and suggestions typically in text boxes that the creator or administrator can utilize as necessary to modify a path, step or other section of a map to increase its effectiveness. For instance concerning an intersection point question, the user may not feel he/she can answer a particular question according to the provided choices. A "don't know" or "other" choice maybe given in which the user is provided a text box to explain why none of the provided answers are satisfactory. If this question occurs at the end of a path that is not an exit location, the intersection point logic may not be able to determine where to send the user via an intersection link and accordingly the user would be connected to the default link's path or step.

A Method of Constructing an Intellect Map According to One Embodiment of the Present Invention The methodology of creating intellect maps conforming to the structural requirements of the embodiments and variations recited above can vary significantly and substantially. The basic process that can be applied in a variety of manners is illustrated in the flow diagram 500 of FIG. 8.

Figure 8:
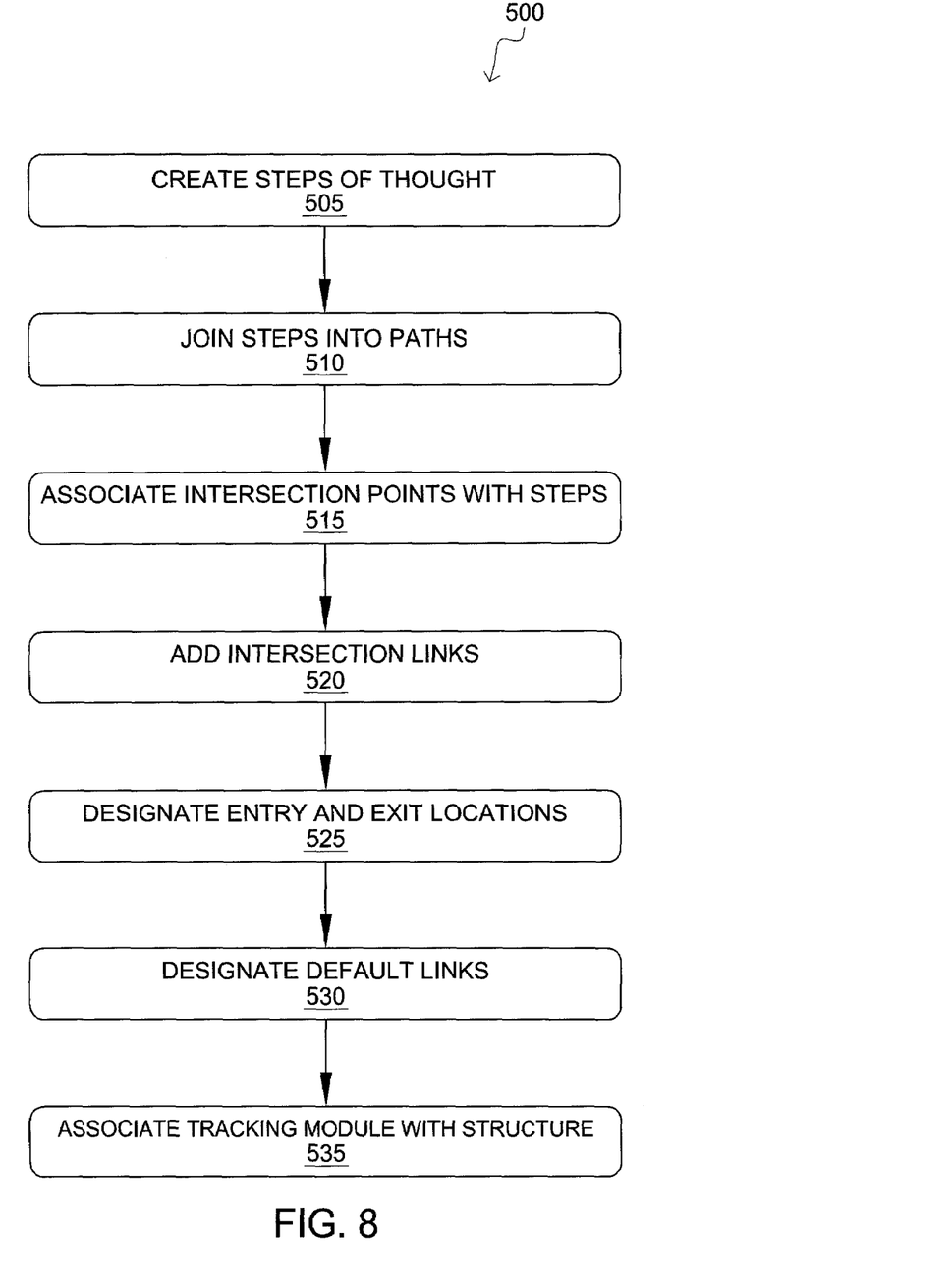
FIG. 8 is a flow chart depicting the process by which an intellect map is generated by a creator according to one embodiment of the present invention.

In the most simple variation, an expert who desires to create a map concern a particular topic simply start by writing down his/her thoughts and information concerning a particular topic. Next, working with intellect mapping professionals, the thoughts are broken into steps as indicated in block 505 and reconstructed into paths as indicated in block 510. Since intellect maps generally follow the manner in which a person thinks, the creation of steps and paths usually requires only breaking up an expert's writing into discrete steps and linking the steps together into a path. Further, any tangential thoughts or issues may be dissected and re-constructed into additional paths.

In other variations, templating and map creation software can be provided to the expert to facilitate the creation of steps and the linking of the steps into paths as indicated in blocks 505 & 510.

Typically, connecting steps of though into paths only requires providing a link between one thought to the next sequential related thought. In most applications where the data and information related to a step is to be visually displayed, the connections are provided by hyperlinks or a similar mechanism, although in variations other ways of linking the steps can be utilized such as timed links that automatically flow to the next step unless some user action is taken.

At some point in the map creation process the expert may review the various steps and paths and can decide to add more steps and paths as necessary to bolster his/her map. Further, a user may decide to enhance certain steps by adding additional data and information often in additional step levels. The additional information can comprise additional text, audio, pictures, photographs, video or any other suitable material. An expert may also provide a link to information external to his/her map, such as a particular page on a website. A means for returning to the main level or a preceding level will usually be provided typically in the form of a hyperlink.

At some point in the process, intersection points are assigned to various steps as indicated in block 515. Typically, the intersection points will be added after two or more paths have been created to provide the decision logic concerning the linking of the paths; however, in other variations, an expert might create the intersection point prior to creating the associated path to which the intersection point relates. In yet other variations, the expert might merely create placeholders for the various steps that will be associated with intersections points so that he/she or intellect mapping professionals he/she is working with can add the actual intersection point and its associated decision information later.

In some variations the decision logic can be simple "If-Then" based rules that potentially link the user to another step in another path upon satisfaction of a condition. For example, satisfaction of the condition can depend on an answer to a question posed by the creator to a user. In other variations, the decision logic can be quite complex and utilize advanced AI techniques.

Once at least one intersection point is associated with a step in a first path, one or more intersection links can be coupled to the intersection point on one end thereof and to a step in another path at another end. As can be appreciated in variations, a creator may associate an intersection link with an intersection link placeholder if the creator knows the paths he/she wants to link but has not yet created the decision logic that will facilitate traverse between the paths. Further, a user may add intersection links to a map prior to creating the linked to paths and the user will come and create the paths at a later time.

It is to be appreciated that the creation of a map does not necessarily proceed in the linear fashion indicated in FIG. 8 wherein the expert first creates all the steps and paths before creating the intersection points and links. Rather, the intellect map system allows maps to be created in any manner that is desired by the creator.

During the building process of the map, each entry and exit location is defined and any associated information as indicated in block 525. Typically, although not necessarily, one entry location comprises the first step in the first path created. Other entry location can be provided as desired by the creator and although entry locations typically are located at a first step in a path they are not necessarily required to be.

In contrast, Exit locations typically occur at the last steps in selected paths although this need not universally be the case. Exit locations are further associated with information that tells what the conditions were that caused a user to exit at a particular location. For instance, one exit of the anti-death penalty structure example may be for someone who has expressed a belief that the death penalty is wrong. Accordingly, if another map creator desires to incorporate the anti-death penalty structure into his/her map, he/she knows a person exiting from this particular location has a particular view and he/she design his map to direct the user to the appropriate path or other structure in the map based on this view.

Every last step in any path must have a default link associated with it and accordingly as indicated in step 530, at least one default link for a particular structure must be designated. The default link may be an exit location or at least it must be a step on a path that leads to an exit location. The creator may specify the default location at the beginning of the map creation process such that it is automatically applied to the last step in any path. The functionality of the map creation software may be configured to automatically move the associated from one step to another as additional steps are added to a path such that no matter where the creator ends a path it will have default linkage in place. A creation program may also automatically remove the default link when and if a particular last step is designated as an exit location. Alternatively, the user may designate default links manually for each last step in each path that is not an exit location.

Depending on the embodiment, a creator can also associate a structure, complex structure or map with a tracking module as indicated in block 535. The map creation software can be configured to automatically track the user's movement through a map or in other variations the creator can indicate what data or information he/she wants to be tracked. Further, the creator can associate certain added features such as answers to questions posed and user provided feedback to the list of tracked items. In certain variations, the user can also specify certain types of reports to be generated based on the tracked information for one or a plurality of users. The report function may permit statistical analysis to be applied to the tracking data.

The creation of complex structures is generally similar to the creation of structures except for the ability to use other and multiple structures within a map.

Figure 9:
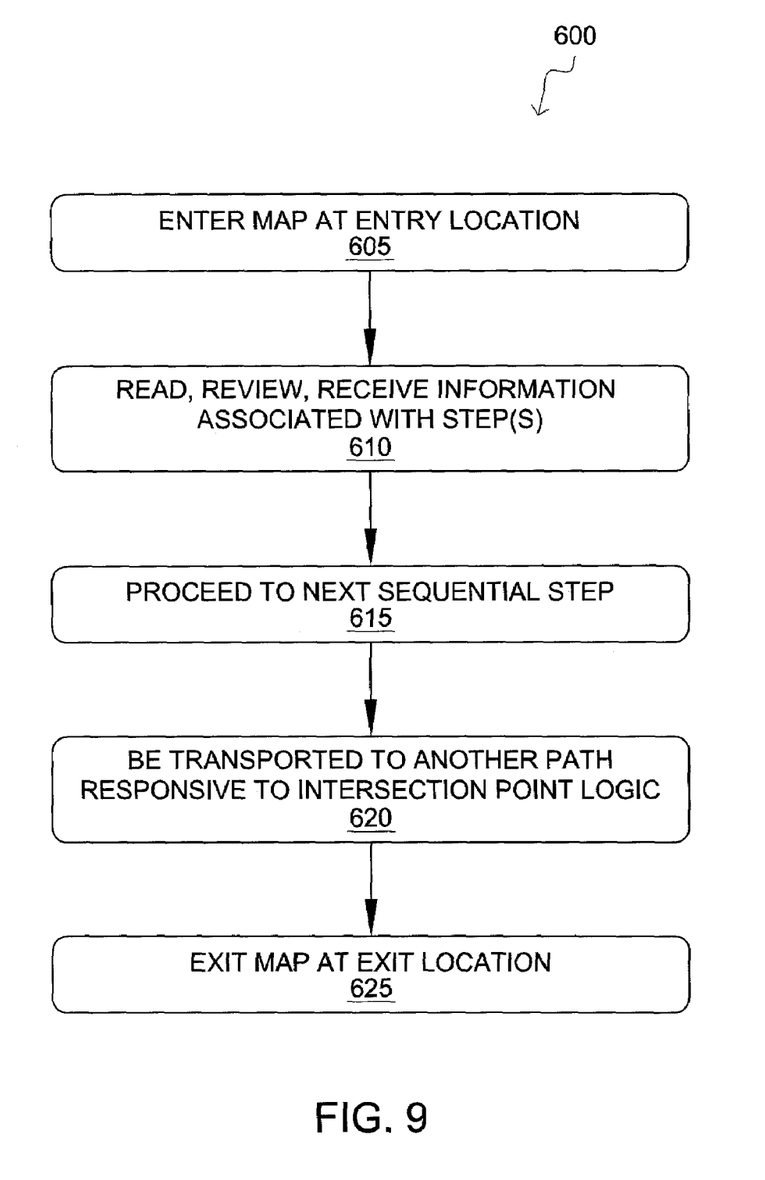
FIG. 9 is a flow chart depicting the navigation of an intellect map structure by a user according to one embodiment of the present invention.

A Method of Navigating an Intellect Map According to One Embodiment of the Present Invention FIG. 9 is a flow chart illustrating one method of navigating an intellect map according to an embodiment of the present invention. To navigate an intellect map, a user enters the map, whether a structure or a complex structure, from an entry location as indicated in block 605. When the map is displayed on a web browser, the entry location is typically displayed to the user in the form of a web page.

The user reads, views or otherwise receive information and data concerning each step as indicated in block 610. He/she may click links to delve deeper into levels of a step if available. As indicated in block 615, when the user desires to navigate to a next sequential step in a path, he/she typically clicks a provided hyperlink. If permitted, the user may be allowed to leave comments or other information for the creator to review.

When the user encounters a step that is associated with an intersection point he/she may be transported to a step in a new path if the decision logic of the point is satisfied as indicated in block 620. The logic in some maps will be dependent on a question posed to the user. If he/she answers one way, he/she may be transported to one step in another path. If he/she answers another way, he/she will be transported to yet another step in another path or perhaps he/she will remain on the current path to progress to the next sequential step. In other maps, the application of the logic may depend on any number of factors relating to the user's navigation of the associated structure or complex structure. Of course as is obvious to one of ordinary skill in the art given the benefit of this disclosure, the combinations and permutations of outcomes related to the application of intersection point logic is limited only by a particular map's configuration.

Navigating the map a user may encounter any number of intersection points and links and may traverse numerous paths. Ideally, the information the user is exposed to is relevant to the user as ascertained by the intersection point logic. Information that is not relevant to a user's need and/or positions is hidden from the user thereby increasing the meaningfulness of the information and data the user is exposed to. In certain embodiments, the actions of the user are tracked and tabulated for review and use by the map's creator/administrator.

At some point, the user will encounter an Exit location wherein he/she can exit the map having been exposed to either or both the information he/she desired and the information the map's creator wanted the user to be exposed to as indicated in box 625.

Alternative Embodiments and Other Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

I claim:

1. A machine readable media having computer executable instructions that when executed by a processor create a construct configured to organize and disseminate information, the construct comprising:
    at least a first structure, the first structure including,
        a plurality of steps, wherein at least a portion of the plurality of steps are arranged into a plurality of paths having two or more sequentially linearly arranged steps, wherein each path of the plurality of paths has a first step in the sequence and a last step in the sequence,
        at least one intersection point associated with a step of a first path of the plurality of paths, and
        at least one intersection link coupled with the at least one intersection point at an end and being associated with a step of a second path of the plurality of paths at an opposing end, wherein the intersection link is configured to navigate to a second path of the plurality of paths in a non-sequential manner;
    wherein the structure includes a predetermined number of entry locations and a predetermined number of exit locations providing the only means for entering and exiting the structure.

2. The construct of claim 1, wherein at least one of the first steps is an entry location.

3. The construct of claim 1, wherein at least one of the last steps is an exit location.

4. The construct of claim 1, wherein at least the first path does not include decision logic to facilitate navigation sequentially along the first path.

5. The construct of claim 1 further comprising a tracking module.

6. The construct of claim 5, wherein the tracking module further comprises the capability of (i) performing statistical analysis of information and data recorded by the tracking module, and (ii) disseminating results of the statistical analysis to a person.

7. The construct of claim 1, wherein each last step is further associated with a default linkage.

8. The construct of claim 1, wherein the structure is self-contained requiring no external logic to facilitate navigation of the structure by a person.

9. The construct of claim 1, wherein for each step of the plurality of steps at least a portion of the data associated with the step is adapted for textual, picture, video, or audio dissemination to a person.

10. A combination comprising:
    two or more constructs of claim 1; and
    one or more intersection points external to the two or more constructs and one or more intersection links also external to the two or more constructs associated with the at least one external intersection link;
    wherein combination has (a) a predetermined number of entry locations and exit locations, and (b) no logic external to the combination to facilitate navigation of the structure by a person.

11. A machine readable media encoding computer executable instructions that when executed by a processor perform a method of recording and organizing information into an intellect map, the method comprising:
    creating a plurality of steps of thought;
    joining two or more steps of thought into two or more paths, each path having no decision logic associated with moving between sequential steps of thought in the path;
    associating one or more intersection points with one or more steps of thought; and
    providing one or more intersection links for each intersection point and associating each link with a destination step of thought (i) in a path different from the path having the associated intersection point in a non-sequential manner, or (ii) to a non-adjacent step on the same path.

12. The method of claim 11, further comprising creating decision logic for each of the one or more intersection points.

13. The method of claim 11, further comprising defining one or more entry locations and one or more exit locations.

14. The method of claim 11, wherein each path includes a last step of thought occurring at the end of the path, and further comprising associating a default linkage with the last step of thought for each path that is not an exit location.

15. The method of claim 11, further comprising editing the intellect map based on at least one of: (i) comments of user's who have navigated at least a portion of the map; and (ii) statistical data concerning how a plurality of users have navigated at least a portion of the map.

16. A system for disseminating information to a user, the system comprising:

a processor;

a memory having computer executable instructions stored thereon, that when executed by the processor;

provides a structure, the structure comprising, (i) a plurality of steps arranged into a plurality of paths having two or more steps, the paths not having any decision logic to facilitate sequential linear navigation of the path, (ii) one or more intersection points, each intersection point being associated with one step in one path, (iii) one or more intersection links, wherein the one or more intersection links are configured to navigate to either (1) a second step in the path in a non-sequential manner or (2) a second path of the plurality of paths in a non-sequential manner, wherein each intersection link is coupled to an associated intersection point at a first end and to either (1) the second step in the path or (2) the second path of the plurality of paths at its opposing second end, (iv) at least one entry locations, and (v) at least one exit locations;

permits a user to enter the structure only at an entry locations of the at least one entry location and displays information and data associated with the entry location; transports the user to a next sequential step in the first path in response to at least one action of the user in a one step of a first path and displays information and data associated with a next sequential step;

at the next sequential step, applies decision logic of a first intersection point based on data particular to the user, transports the user to another step in a second path and displays information and data associated with the another step; and permits the user to leave the structure only at an exit location of the at least one exit locations.

17. The system of claim 16, further comprising a static version where all the possible ways of navigating the map are preprocessed into files and are connected together with static navigational and intersection links.

18. The system of claim 17, further comprising encrypting the navigational and intersection links and other sensitive data to secure against unauthorized use.

19. The system of claim 16, wherein the at least one action of the user comprises (a) answering a question posed to the user or (b) the manner in which the user has navigated the structure.

20. The system of claim 16, further comprising tracking the user as the user navigates the structure and recording data relating to the navigation.

* * * * *